DIGITAL DATA ANALYZING DEVICES

Filed Feb. 24, 1960 2 Sheets-Sheet 1

INVENTORS
ABRAHAM FRANCK
GEORGE F. MARETTE
BERC I. PARSEGYAN

BY Cushman, Darby & Cushman
ATTORNEYS

DIGITAL DATA ANALYZING DEVICES

Filed Feb. 24, 1960 2 Sheets-Sheet 2

INVENTORS
ABRAHAM FRANCK
GEORGE F. MARETTE
BERC I. PARSEGYAN

BY Cushman, Darby & Cushman
ATTORNEYS

United States Patent Office 3,119,011

Patented Jan. 21, 1964

3,119,011

DIGITAL DATA ANALYZING DEVICES

Abraham Franck and George F. Marette, Minneapolis, and Berc I. Parsegyan, St. Paul, Minn., assignors to Sperry Rand Corporation, New York, N.Y., a corporation of Delaware Filed Feb. 24, 1960, Ser. No. 10,627
14 Claims. (Cl. 235—92)

This invention relates generally to circuits suitable for analyzing digital data and the employment thereof to form binary counting circuits.

A counter in its simplest form is a device which adds or subtracts an increment to a number. It is most generally useful if the increment is unity, unity being common to all non-zero radix systems. When an increment is added to a number the counter is said to be of the increasing type whereas if the increment is subtracted from the number the counter is of the decreasing type.

In general, there are two basic methods of counting in a computer, i.e., serial or parallel. In the serial method a one is added to the next higher stage until there are no more carries. This method of counting generally uses less apparatus. In the parallel method of counting, the logic is such that the next higher count is sensed and all the affected counter stages are changed simultaneously. The parallel method of counting usually requires more apparatus for implementation but faster speeds are attainable. The counters of the present invention are confined to the latter type.

Broadly, the present invention provides an input register which stores the digital word or number that is to be operated upon. A plurality of variable state storage devices are coupled to the register and biased so as to be representative of the word stored therein. Sensing means are coupled to the devices in discrete combinations such that the outputs therefrom located a predetermined digit of the abovementioned word and in accordance therewith cause the appropriate count to be written into the input register and also to provide an end of count signal when the modulus of the count register has been exceeded.

The variable state storage devices may be of several types. However, preferred and herein illustrative embodiments of this invention use thin ferromagnetic films with uniaxial anisotropy, i.e., films having a single easy or preferred axis of magnetization and transverse thereto a single difficult magnetization axis, both axes being in the plane of the film, for the abovementioned variable state storage devices. Such films are most easily prepared by vacuum deposition of a nickel-iron binary alloy having, for example, approximately 82% nickel, remainder iron, in the presence of a strong orienting field applied in the plane of the film as described in the Rubens Patent No. 2,900,282. However limitation to thin ferromagnetic films is not intended. Because of the high speed properties of thin ferromagnetic films, the preferred and herein illustrative embodiments of the invention allow faster execution times then can be attained with other variable state storage devices. Furthermore, the miniature physical size of film elements allows for a more compact construction than is possible with other devices.

The thin ferromagnetic films as prepared by the abovementioned Rubens patent are found to exhibit reversible magnetic rotation properties. These rotational properties as fully explained in the copending application of Rubens, Sidney M. et al., Serial No. 626,945, filed December 7, 1956, now Patent No. 3,030,612, are employed herein.

Briefly, the magnetization of these films may be reversibly rotated by a magnetic field applied at an angle other than 0° or 180° thereto. By applying a biasing field transverse to the magnetization of the films, the magnetization is rotated out of alignment with the preferred or easy axis thereof. When so rotated a longitudinal field acting in a direction parallel to the preferred axis exerts a rotational torque on the magnetization. If no transverse field is applied, the magnetization lies parallel to the preferred axes thereof and the longitudinal field causes no rotation thereof. The longitudinal field must be of a strength insufficient to cause the magnetization when parallel to the preferred axes to switch states by 180°. By properly positioning sense lines in inductive relationship with the films, an output signal is induced therein by the magnetization of these films coupled thereto which is rotated by the application of the longitudinal field. The sense line positioning is treated in detail in the copending application of Arthur V. Pohm, Serial No. 855,220, filed November 24, 1959, now Patent No. 3,070,783.

By use of reversible rotation, an identical counting array of film elements may be used to provide either an increasing or a decreasing counter merely by reversing the direction of applications of the transverse biasing field by 180° as will be shown later.

It is accordingly an object of the present invention to provide a means of implementing a binary counter.

Another object of the invention is to provide counting devices capable of attaining higher counting rates than heretofore possible.

Still another object of our invention is to provide a counter which utilizes the high speed reversible rotation properties of thin ferromagnetic films to achieve the desired result.

Yet another object of our invention is to provide a counter yielding "toggle" type inputs to the count register stages.

Yet still another object of our invention is to provide a counter yielding "set" type inputs to the count register stages.

A further object of this invention is to provide a means of utilizing the same physical array of thin film components to implement counters of both the increasing and decreasing type.

A yet further object of this invention is to provide a counting device which yields an indication that modulus of said device has been exceeded.

Other objects and advantages of this invention will become obvious to those having ordinary skill in the art by refereince to the following detailed description of exemplary embodiments of the invention and the appended claims. The various features of the exemplary embodiments may best be understood with reference to the following drawings, wherein—

Figures 1, 2A, 2B:
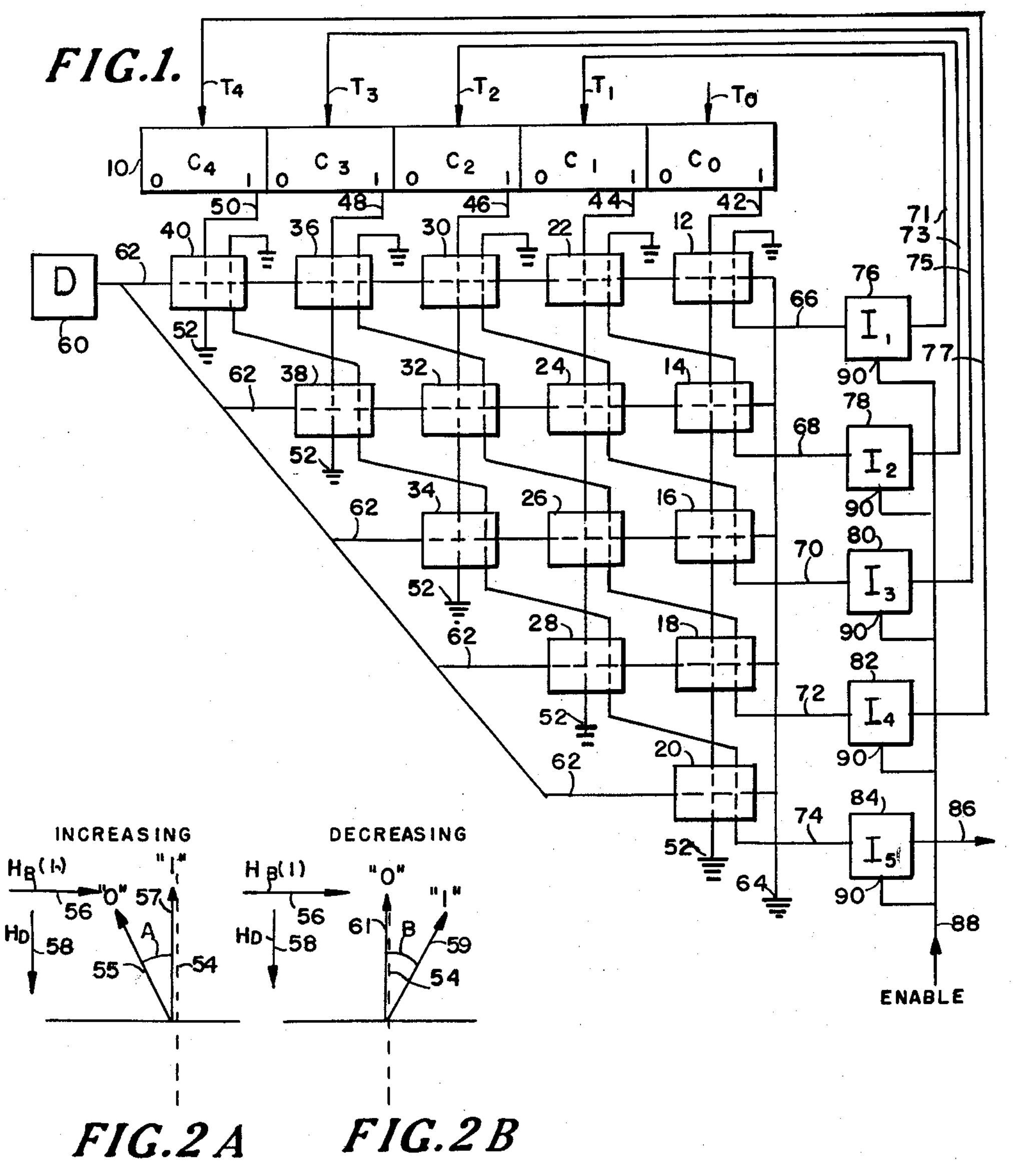
FIGURE 1 illustrates an exemplary embodiment of a counter having toggle type inputs and constructed according to the teachings of the present invention.
FIGURE 2A illustrates vectorially the field conditions controlling the operation of the circuit of FIGURE 1 for an increasing counter.
FIGURE 2B illustrates vectorially the field conditions controlling the operation of the circuit of FIGURE 1 for a decreasing counter.

As shown in FIGURE 1, one embodiment of this invention consists of a count register 10 along with appropriate apparatus for incrementing the register when the count is to be altered. For the purpose of illustration only, register 10 is shown as consisting of five individual bistable stages labeled $C_0$ through $C_4$ but limitation to a five stage counter is not intended. In general, the input register consists of $n$ bistable stages, wherein $n$ is an integer, there being as many stages as desired. Each of the stages $C_0$–$C_4$ consists of circuitry capable of assuming two stable states which may be termed the "1" state and the "0" state. In this embodiment, these circuits are of the toggle input type. A toggle type input as discussed herein refers to an input circuit to a flip-flop stage, which when energized causes the flip-flop to reverse states and is to be distinguished from a set type input which when energized can reverse the state of the flip-flop only when it is in its "0" or cleared state. Both the toggle type inputs and the set type inputs are described on page 48 of the book, "Arithmetic Operations in Digital Computers," by R. K. Richards, published by D. Van Nostrand Co., Inc., in February 1955. Such circuitry is quite well known in the art under the generic and descriptive term flip-flop and hence will not be discussed in detail. Since in this embodiment register 10 consists of five stages each of which is capable of assuming two well defined states or levels of potential, the modulus of register 10 is $2^5-1$.

Associated with register 10 is an array of variable state devices 12–40 which in the preferred embodiment are thin ferromagnetic film elements which have been deposited or otherwise affixed to a substrate (not shown) according to the aforementioned Rubens Patent No. 2,900,282. Connected to the arbitrarily defined "1" terminals of the count register stages $C_0$ through $C_4$ are bias lines 42 through 50 each of which magnetically couples a column of films in the array. The windings 42 through 50 are represented as thin lines in the schematic drawing whereas in the actual circuit these windings, like the remaining windings shown schematically in FIGURE 1, are current sheets, which may be prepared by using printed circuit etching techniques such as explained in the abovementioned Rubens patent although limitation thereto is not intended. The bias windings are oriented such that they run in a direction substantially parallel to the preferred or easy axis of the films associated therewith. In FIGURE 1 the films are oriented such that the easy axis is parallel to the length of page (top to bottom) unless otherwise defined. Hence, when a particular stage, say stage $C_0$ of count register 10, is in its "1" state a current flows through its associated bias winding 42 to ground terminal 52 and establishes a magnetic field in the proximity of films 12 through 20, which (as can be verified by using the right hand rule) acts in a direction substantially transverse to the easy axis of these films. In the vector diagrams of FIGURES 2A and 2B the easy axis of each film is indicated by dashed line 54 and the bias field $H_B(1)$ produced by current flowing through windings 42 through 50 is indicated by vector 56, FIGURE 2A being a vector representation of an increasing counter while FIGURE 2B is that of a decreasing counter.

In order to function as an increasing counter, that is a counter which when incremented assumes a count larger in magnitude than the count originally contained in the count register, the film array is initially biased such that when no biasing field is applied via lines 42 through 50, the magnetization of all the films in the array is at some angle A with respect to their respective easy axes thereby placing all the films in an arbitrarily defined "0" state shown by vector 55 in FIGURE 2A. For sake of clarity in the drawing, the means used to establish this initial state of bias is not shown. In its general form this means consists of a constant current generator which supplies current to a plurality of conducting sheets aligned parallel to the easy axes of all the films in the array.

With this initial bias condition established in the array and a number, or digital word as it is commonly referred to, entered into the count register 10, certain films in the array will have their magnetization rotated back into alignment with their easy axes thereby placing them in an arbitrarily defined "1" state, as shown by vector 57, by the action of the biasing field $H_B(1)$, which as mentioned above, is established when a "1" is contained in a particular count register stage. Now, when a longitudinal drive field $H_D$, indicated by vector 58 in FIGURE 2A, is applied to all the films in the array, the magnetization of those films whose magnetization is still at an angle A with respect to their easy axes, i.e., the magnetization of those films that are in the "0" state, will be further rotated and thereby induce an output signal on a suitably arranged sense line inductively coupled thereto. No significant signal will be induced in those sense lines linking films whose magnetization has been rotated into alignment with their easy axes, i.e., that are in the "1" state, since in this case the drive field is incapable of producing a further rotation. In this preferred embodiment, the longitudinal drive field is applied parallel to the preferred film axes and anti-parallel to the arbitrarily defined "1" and "0" states respectively shown by vectors 57 and 61 in FIGURES 2A and 2B. Alternatively, this drive field may be applied parallel to vectors 57 and 61. This field is also of a predetermined strength insufficient to cause the films existing in states represented by vectors 57 and 61 to switch states, i.e., reverse direction by 180°.

The drive field $H_D$ is applied to the array via current pulse generator 60 and its associated current carrying conductors 62. Conductors 62 are oriented substantially transverse to the easy axes of the films in the array such that when current flows from source 60 to ground terminal 64, a magnetic field $H_D$ will be established in the proximity of the films which act parallel to the easy axes of the films.

Sense lines 66 through 74 thread throughout the array in the manner shown in FIGURE 1. These sense lines are arranged so that the first, e.g., line 66, is coupled to a device, e.g., film 12, which is coupled to the first register stage $C_0$, while the second sense line, e.g., 68 is coupled in common to devices, e.g., films 14 and 22, which are coupled to the 1st and 2nd register stages $C_0$ and $C_1$ and so forth up to the next to last sense line, i.e., with an $n$ stage register, there are $n$ sense lines, the next to last one being designated as the $n-1$th sense line, being coupled in common to devices, e.g., 18, 26, 32, 36, which are otherwise coupled to all of the register stages 1st to $n-1$th inclusive, e.g., $C_0$–$C_3$. The $n$th sense line is coupled in common to devices, e.g., 20, 28, 34, 38, 40, which are otherwise coupled to all the register stages $C_0$–$C_4$ inclusive. As will hereinafter become apparent, the $n$th sense line is not needed for counting with an $n$ input register. However, it is used to provide an end-of-count signal where desired. These sense lines are respectively connected at one end to inverter circuits 76 through 84. As a result, if a substantial signal appears on a particular sense line, say line 68, no signal results at the output of inverter 78. Conversely, if no signal is induced in a particular sense line, a substantial signal is produced at the output of its associated inverter stage. Line 88 leads to the enable terminals 90 of inverters 76 through 84. The inverters are provided with gating means in order to prevent spurious signals which may result at the time the biasing field $H_B(1)$ is applied from causing an output from any of the abovementioned inverters. A pulse on line 88 coincident with the application of the drive pulse from generator 60 enables the gate and permits the information induced on the sense lines to pass through the inverters. The output 71 from inverter 76 which is otherwise connected to the first sense line 66 is coupled back to the toggle input terminal $T_1$ of stage $C_1$ of the count register 10. Similarly, the outputs 73, 75, 77 from inverters 78, 80, and 82 are coupled back to the toggle terminals $T_2$, $T_3$ and $T_4$ of count register stages $C_2$, $C_3$ and $C_4$ respectively. In general the outputs from the inverters are each coupled to a register stage of one higher order of significance than the highest order stage to which its associated sense line is otherwise coupled. For example, output line 71 is coupled to the 2nd stage $C_1$ while its associated sense line 66 is otherwise coupled to the 1st stage $C_0$. A fifth toggle input $T_0$ is provided for stage $C_0$ and this terminal receives a toggle pulse each time the counter is to be incremented. $T_0$, however, is not pulsed until after the $H_D$ field has been removed.

In counting actions it is often desirable to obtain an indication when the count has reached modulus $2^n-1$ for an increasing counter or zero for a decreasing counter, where $n$ equals the number of binary bits in the counter. In the circuit of FIGURE 1, this is accomplished by the diagonal row of films 20, 28, 34, 38 and 40 which are linked by sense line 74. Sense line 74 is brought out to inverter 84 which yields the proper "end-of-count" signal for both the increasing or decreasing counter.

If an end-of-count signal other than modulus $2^n-1$ or zero is desired, it may be obtained by appropriately biasing each of the films in the above-mentioned "end-of-count" row. For a fixed end-of-count signal, one bias generator may be used to bias this row and for a variable end of count each film in the end-of-count row requires separate controllable bias generators for each film in this row.

Now that the operation and arrangement of the circuit of FIGURE 1 has been described in general terms, a few specific examples may be useful in illustrating the circuit operation. As a first example, assume that the circuit is to function as an increasing counter. All films in the array are initially biased to their arbitrarily designated "0" state as represented by vector 55 in FIGURE 2A, i.e., the magnetization vectors of all the films in the array are initially biased so as to be displaced from their easy axes by some angle A. Now assume that the number 01011 (decimal 11) has been entered into count register 10 with the digit of the lowest order of significance in stage $C_0$ and the highest order digit in stage $C_4$. Under this condition, again proceeding under the assumption that when a stage is in its "1" state an output signal results therefrom, a current flows through bias lines 42, 44 and 48 to ground terminals 52, whereas no current flows through bias lines 46 and 50. With current flowing through these lines a bias field $H_B(1)$ indicated by vector 56 is applied to films 12 through 28 and to films 36 and 38 which causes the magnetization of these specific films to rotate from their initial or "0" position back into alignment with their respective axes. To advance the counter, i.e., to initiate a count, current driver 60 is energized thereby producing a current pulse on drive lines 62. This current pulse establishes the drive field $H_D$, indicated by vector 58, in coincidence with the $H_B(1)$ field, in close proximity to all films in the array. Since, as mentioned previously, the drive field $H_D$ is incapable of producing a further rotation of the magnetization in those films whose magnetization is in alignment with their easy axes, films 12 through 28 and films 36 and 38 will be unaffected by the drive field $H_D$. Since a "0" is stored in stages $C_2$ and $C_4$ of register 10, no bias field $H_B(1)$ is applied to films 30 through 34 and to film 40 and hence the magnetization of these films remains displaced from their easy axes. Under this condition, the drive field $H_D$ exerts, so to speak, a torque on the magnetization vector of these four films and causes a further rotation. This further rotation induces a substantial signal on sense lines 70, 72, and 74 which magnetically link at least one of the films 30 through 34 and film 40 respectively. No significant signal is induced on sense lines 66 and 68.

The information contained on sense lines 66 through 74 is inverted due to inverters 76 through 84 and hence a substantial signal is impressed on toggle input terminals $T_1$ and $T_2$ whereas no signal is impressed on terminals $T_3$ and $T_4$. Also no signal appears on the output line 86 of the "end-of-count" inverter 84. The effect of the signals on lines $T_1$ and $T_2$ is to toggle their corresponding stages. Also, as mentioned previously, terminal $T_0$ receives a toggle pulse each time the counter is to be advanced. It can be seen then, that the information contained in the count register after the drive pulse is applied will be 01100 (decimal 12) and that the previous count has been incremented by unity.

As a second example, assume that the binary word 00110 (decimal 6) is stored in the count register 10 and that the circuit is to operate as a decreasing counter rather than an increasing counter. To so function, the films are not initially biased as with an increasing operation. Therefore, the magnetization of the films 12—40 originally lies parallel to their respective preferred axes 54 in FIGURE 2B. This is arbitrarily designated as the "0" state and is represented by vector 61 in FIGURE 2B. Since register stages $C_1$ and $C_2$ each store a "1," current flows through lines 44 and 46 thereby applying the $H_B(1)$ field represented by vector 56 to films 22—34. The $H_B(1)$ field causes the magnetization of these films to rotate to some position at an angle B with the preferred axes thereof which is represented by vector 59. This is arbitrarily defined as the "1" state. The magnetization of the remaining films do not have this field applied thereto and therefore remain in the "0" state as indicated by vector 61. Activation of count initiater 60 causes a current pulse to flow in lines 62 thereby applying the $H_D$ field represented by vector 58 to all the films. The $H_D$ field is directed parallel to the preferred axes 54 and in the preferred embodiment anti-parallel to the "0" state magnetization. As before mentioned it is not essential that the $H_D$ field be applied anti-parallel to the "0" state. Alternatively it may be applied parallel thereto. This field causes the magnetization of the films existing in the "1" state, i.e., films 22—34 to be further rotated thereby inducing a substantial signal in sense lines 68, 70, 72, and 74. The magnetization of the remaining films is not rotated thereby and therefore no significant signal is induced in sense line 66. Again the inverters 76—84 are enabled in coincidence with the activation of generator D by a current pulse on line 88. Thus the inverter 76 is the only one which produces an output signal. This signal is applied through line 71 to toggle input terminal $T_1$ of register stage $C_1$ causing it to change state. The input terminal $T_0$ of stage $C_0$ is pulsed subsequent to the activation of generator D as before explained and the word now stored in the input register 10 is 00101 (decimal 5) which is the correct result.

To see the circuit operation wherein an end-of-count signal is provided assume that the binary word 00000 (decimal 0) is initially stored in the count register 10 and that the circuit is to operate as a decreasing counter. As before explained, for the decreasing counter no initial state of bias need be established in the array so that when the bias field $H_B(1)$ is zero, the magnetization of all films in the array is initially in alignment with the easy axes of these films. With the word 00000 initially in the count register no current will flow through any of the bias lines 42 through 50 to establish the field $H_B(1)$. Hence the magnetization of the films magnetically associated with these lines remains in alignment with their easy axes. Now when drive pulse $H_D$ is applied to the array via generator 60 and drive lines 62, none of the films in the array will have a torque applied to their magnetization and hence there will be no further rotation thereof to induce a substantial signal in any of the sense lines 66 through 74. After inversion by inverters 76 through 84, substantial signals are applied to all of the terminals $T_1$ through $T_4$. Of course, the toggle input to stage $C_0$ is energized each time the count is to be changed as before described. It can be seen then that the information contained in register 10 after application of the drive field $H_D$ is 11111 (decimal 31).

In addition, it can be seen that after inversion an output signal will appear on line 86 indicating that count has exceeded the modulus of the count register. This signal may be used to initiate suitable control functions in a computer or alternatively may be used to trigger the drive current generator 60 of another counter identical to the one illustrated in FIGURE 1 so as to keep a count of the number of times the first counter has been filled.

Figures 3, 4A, 4B:
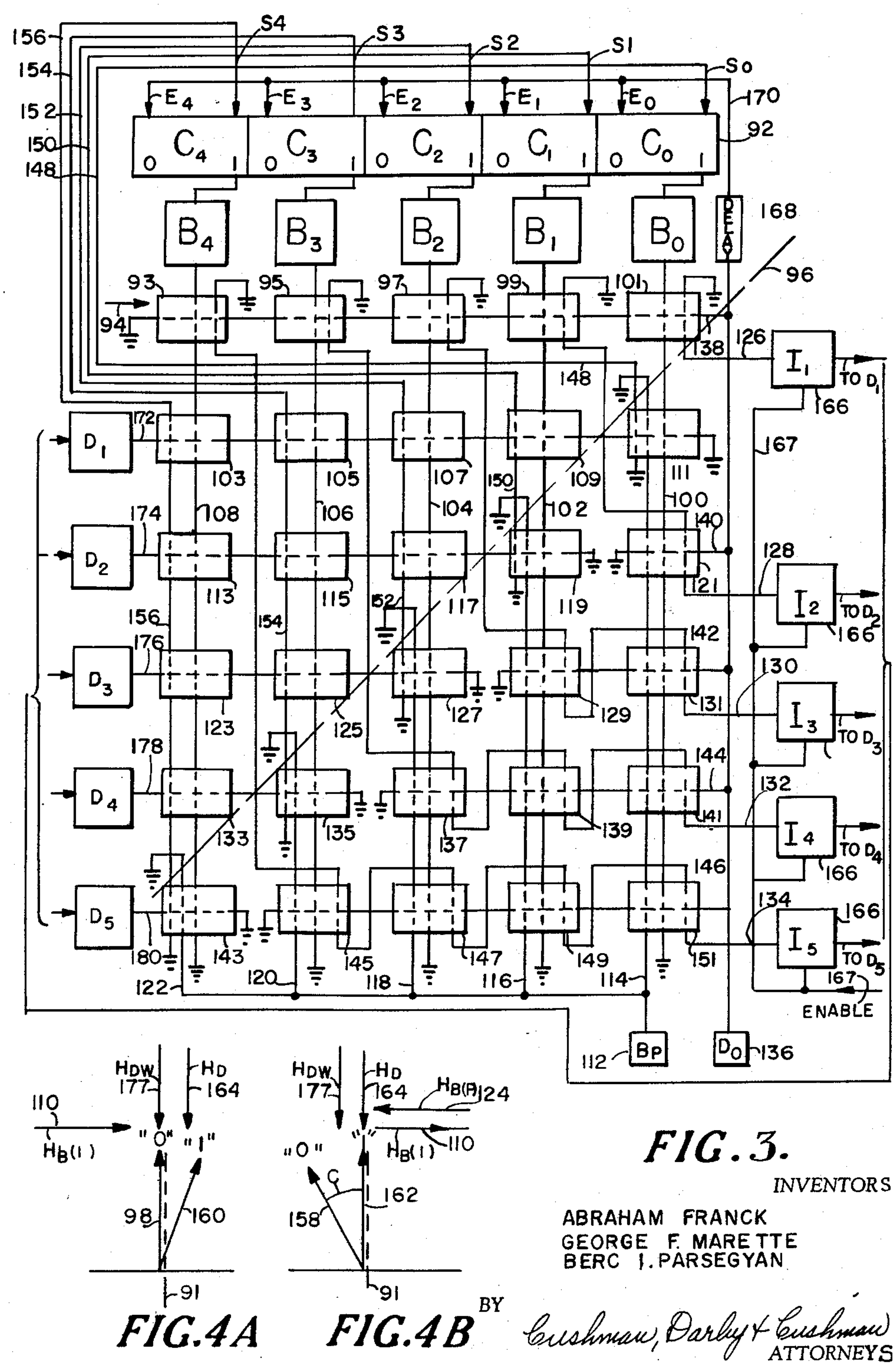
FIGURE 3 illustrates another exemplary embodiment of the invention which provides set type inputs to its count register.
FIGURE 4A shows vectorially the field conditions controlling a portion of the films of FIGURE 3.
FIGURE 4B shows vectorially the field conditions controlling the remainder of the films of FIGURE 3.

FIGURE 3 illustrates schematically a binary counter having "set" type inputs to the count register stages. Again for the purpose of illustration the count register 92 is shown as comprised of only five individual stages labeled $C_0$ through $C_4$. In general the input register has $n$ bistable stages where $n$ is any integer, $n$ being equal to 5 in the preferred embodiment. It should be understood that it is within the realm of ordinary skill in the art for one to construct a counter having a larger modulus after reading this disclosure and limitation to a counter of modulus $2^5-1$ is again not intended. Stages $C_0$ through $C_4$ may be, as in the embodiment of FIGURE 1, binary flip-flops. A "set" type input is one which when energized can reverse the state of the flip-flop thereto connected only when it is in its "0" or cleared state. The count register has five set type input terminals $E_0$–$E_4$, one for each stage respectively.

The circuitry employed for incrementing the M-bit count register of this embodiment is an $Mx(M+1)$ matrix of variable state storage devices, e.g., thin ferromagnetic film elements 93—151. Again the thin film elements are manipulated in a reversible rotation mode by the action of a pair of orthogonally applied fields, i.e., a transverse biasing field and a longitudinal driving field. The top row of films 94 of the matrix as well as the films to the left of the dashed diagonal line 96 are initially positioned or biased (by means not shown) such that when no transverse field is applied thereto, the remanent magnetization of these films is aligned with their respective easy axes 91 in their arbitrarily defined "0" states as is indicated by vector 98 of FIGURE 4A. Again, the circuit is designed such that when one or more of count register stages $C_0$ through $C_4$ contains a "1" the bias lines of lines 100 through 108 associated therewith are supplied with a current which produces a transverse field $H_B(1)$ in the direction indicated by vector 110 of FIGURE 4A.

Included in the circuit of FIGURE 3 are current generators $B_0$ through $B_4$. These generators are individually connected to the "1" terminal of stages $C_0$ through $C_4$ such that when a "1" is stored in a particular count register stage its associated generator is activated and therefore supplies a current on the associated bias line of lines 100 through 108. Because the "1" and "0" outputs from a flip-flop are generally represented as being two well defined levels of potential, generators $B_0$ through $B_4$ may not be necessary since the "1" output from the count register flip-flops may be of high enough potential to allow sufficient current to flow to establish the transverse field $H_B(1)$. However, in order to maintain some degree of control over the magnitude and timing of the transverse field, the inclusion of bias current generators $B_0$ through $B_4$ has been found to be desirable.

Besides current generators $B_0$ through $B_4$ an additional current generator 112 is used to supply current to bias lines 114 through 122. As shown in FIGURE 3, bias lines 114 through 122 are magnetically associated with those film elements in the matrix located to the right of the dashed diagonal line 96. The vector field conditions controlling these films are shown in FIGURE 4B, while the vector field conditions controlling the films to the left of line 96 are shown in FIGURE 4A. A current supplied from generator 112 produces a magnetic field which acts on these films in the direction of vector 124 in FIGURE 4B. As a result, when the count register 92 is cleared, i.e., all register stages are in their "0" state, the films to the right of line 96 have their magnetization rotated from an initial position of alignment with their easy axes to a position at an angle C with respect to the easy axes 91. This initial biasing condition on the right diagonal half of the matrix may also be accomplished with simpler wiring and fewer components by orienting the films physically such that their easy axes are at the angle C. However, since at the present time electro-magnetic rotation is more reliable and easier to obtain, it is employed in the preferred embodiment.

The particular principle of operation of an increasing counter having "set" inputs is that of finding the lowest order "0" bit in a word, changing it to a "1," clearing all the lower order bits to a "0", and leaving all the higher order bits unchanged. For a decreasing counter the process is reversed in that the lowest order "1" bit is located and changed to a "0"; the lower order bits are set to "1", and the higher order bits are left unchanged. The sequence of operation of the increasing counter can be divided into two cycles. The first cycle called the "read" cycle will basically locate the lowest order "0" position, and the second cycle or "write" cycle will write the next highest count in the count register 92.

The location of the lowest order "0" position is determined by the signals induced on the read sense lines 126 through 134 emanating from the right hand portion of the matrix when a drive field is applied to the matrix via current generator $D_0$, also labeled 136, and associated longitudinal field producing drive lines 138 through 146. These read sense lines are wired to magnetically link the films in the array in the specific manner illustrated in FIGURE 3, i.e., there are $n$ read sense lines, with the first line, e.g., line 126, inductively coupled to a film, e.g., 101, otherwise coupled to the 1st register stage $C_0$; the second sense line, e.g., 128 inductively coupled to films, e.g., 99 and 121, otherwise coupled to the 1st and 2nd register stages $C_0$ and $C_1$ and so forth up to the $n$th sensing means, e.g., 134, coupled in common to films, e.g. 93, 145, 147, 149, and 151, otherwise coupled to all of the register stages 1st to $n$th inclusive, i.e., stages $C_0$–$C_4$. The outputs of these sense lines are respectively coupled through inverters $I_1$–$I_5$ to a plurality of drive generators $D_1$–$D_5$. These generators are coupled to a plurality of longitudinal field producing drive lines 172–180 which couple the films not otherwise coupled by lines 138–146.

A second plurality of $n$ sense lines, i.e., lines 148 through 156, termed the write sense lines are arranged to inductively link all the films otherwise coupled to drive lines 172—180 so that the first, e.g., line 148 is coupled to a film, e.g., film 111, otherwise coupled to the 1st register stage $C_0$ and to the first drive line, e.g., 172 of the second plurality of drive lines; the second, e.g., line 150 is coupled in common to films, e.g., 109 and 119, otherwise coupled to the 2nd register stage $C_1$ and to the first and second drive lines, e.g., 172 and 174 of the second plurality of drive lines, and so forth up to the $n$th sense line being coupled in common to films, e.g., 103, 113, 123, 133, and 143, otherwise coupled to the $n$th register stage $C_4$ and to all drive lines, e.g., 172—180 of the second plurality of drive lines. The outputs of sense lines 148—156 are respectively coupled to the set inputs $S_0$–$S_4$ of stages $C_0$–$C_4$.

The operation of the counting circuit of FIGURE 3 may best be understood by considering a specific example. Assume it is desired to increment the binary number contained in count register 92. As mentioned before, the array is initially biased such that when the count register is cleared of information (stages $C_0$ through $C_4$ all contain "0") the films in row 94 as well as the remaining films to the left of diagonal line 96 have their magnetization aligned with their respective easy axes as is indicated by vector 98 in FIGURE 4A. The remaining films in the array, i.e., the films to the right of diagonal line 96 have a fixed bias field such as indicated by vector 124 applied thereto (or are physically oriented) such that their magnetization is at an angle C with respect to the vertical, as indicated by vector 158 in FIGURE 4B.

With this initial bias condition established, assume the digital word or binary number 01011 (decimal 11) has been entered into the count register 92 and it is desired to increment the counter by 1. Since stages $C_0$, $C_1$ and $C_3$ contain a "1", their associated bias current generators $B_0$, $B_1$, and $B_3$ are activated and in turn cause a current to flow through bias lines 100, 102 and 106. The current flowing through these lines establishes a magnetic field $H_B$ in a direction transverse to the easy axes of the films located in the columns associated with these specific bias lines. This transverse field thereby produced is indicated by vector 110 in FIGURES 4A and 4B. The effect of this filed is to rotate the magnetization of the films in these columns located to the left of the diagonal line 96 to the position indicated by vector 160, in FIGURE 4A, and to rotate the magnetization of the films in these columns to the right of line 96 to the position indicated by vector 162, in FIGURE 4B. Of course, the magnetization vectors of the films in the columns associated with stages $C_2$ and $C_4$ which contain "0's" are left in their initial position.

The read or count initiate cycle is initiated by activating current driver $D_0$. Driver $D_0$ emits a current pulse each time the count is to be advanced, and may be any suitable conventional pulse generator. This pulse of current travels through lines 138 through 146 and establishes a longitudinal field $H_D$ in the films which are linked by these lines. This longitudinal field, indicated by vector 164, in FIGURES 4A and 4B, is directed parallel to the preferred axes 91 and in the preferred embodiment is anti-parallel to vectors 98 and 162. Alternatively $H_D$ can be directed parallel to vectors 98 and 162. The $H_D$ field is also of a predetermined strength insufficient to cause the films existing in the states represented by vectors 98 and 162 to switch states, i.e., reverse magnetic direction by 180°. As mentioned previously, field $H_D$ produces a torque on the magnetization vectors of those films whose magnetization is previously at some angle other than 0° or 180° with respect to the direction of application of this drive field and causes a further rotation thereof. It is this further rotation which induces signals in the suitably arranged sense lines. The drive field $H_D$, however, is incapable of producing a further rotation of the magnetization of those films whose magnetization vector is aligned with the direction of application of this field. Note that the sense lines are arranged physically parallel to the preferred axes of the films, these axes being in the direction of the length of the page (top to bottom). This is to insure that there is no cancellation of signals induced thereon by different films.

With these considerations in mind it is seen that a substantial voltage signal is induced in sense lines 126, 128, 132 and 134 whereas no signal will be induced in sense line 130 by the action of the drive field $H_D$ on the film matrix. The information on sense lines 126 through 134 is inverted by means of gated inverter circuits 166 so that no signal appears at terminals $D_1$, $D_2$, $D_4$ and $D_5$ but a substantial voltage signal appears at terminal $D_3$.

Again, as in the exemplary embodiment of the toggle input counter of FIGURE 1, the inverters 166 are provided with gating means such that a pulse is required on line 167 before the information contained on lines 126 through 134 can pass through said inverters. This "enable" pulse is preferably applied simultaneously with the drive pulse from generator $D_0$ such that spurious signals induced in the sense lines during the initial biasing of the array are prevented from appearing at terminals $D_1$ through $D_5$. The substantial output at terminal $D_3$ indicates that the lowest order "0" bit position in the word contained in register 92 is the third lowest bit in the word. The pulse from driver $D_0$ is delayed by delay line 168 for a predetermined time interval sufficient to allow the hereinafter described "write" cycle to operate on the films as biased by the original word, and from there, applied to the "clear" terminals $E_0$ through $E_4$ of register stages $C_4$ through $C_4$ via line 170 so as to clear out the information previously contained in register 92. The "read" cycle is thus completed.

The "write" cycle is initiated when the signal appearing at the output of one of the inverters 166 is applied to its corresponding write current driver $D_1$ through $D_5$ shown at the extreme left side of FIGURE 3. In this example write driver $D_3$ will be activated. When activated, driver $D_3$ emits a current pulse on drive line 176. The pulse on line 176 produces a longitudinal field $H_{DW}$ directed parallel to the preferred axes 91, and anti-parallel to vectors 98 and 162 on the films inductively associated therewith. Alternatively $H_{DW}$ can be directed parallel to vectors 98 and 162. The $H_{DW}$ field is of a predetermined strength insufficient to cause the films existing in states represented by vectors 98 and 162 to switch states, i.e., reverse magnetic direction by 180°. Since the magnetization of the films 125 and 127 inductively coupled to line 176 is at an angle with respect to the preferred axes thereof, the effect of the write current pulse from generator $D_3$ is to further rotate the magnetization of these two films. This further rotation in turn induces a substantial signal on sense lines 152 and 154 which inductively link said films. This signal is applied to the "set" terminals $S_2$ and $S_3$ of stages $C_2$ and $C_3$ respectively, and causes a "1" to be stored therein. It can be seen that the final result contained in register 92 will be 01100 (decimal 12).

The delay of element 168 is adjusted or designed such that register 92 is cleared only after one of the write current generators $D_1$ through $D_5$ has been activated by a pulse produced during the read cycle. Also, it should be mentioned that the bias generators have sufficient inherent delay so as to prevent a shift in the bias condition of the array between the time that register 92 is cleared and the time that a drive pulse from one of drivers $D_1$ through $D_5$ produces its desired effect on the array during the write cycle.

In order to function as a decreasing counter the circuit of FIGURE 3 must be modified slightly. Since in a decreasing counter it is necessary to determine the lowest order position containing a "1", the initial biasing of the array must be reversed from that shown. This is accomplished by (1) disabling bias generator 112 which will remove the permanent bias from the films to the right of diagonal line 96 and (2) enabling another bias generator (not shown) which will essentially bias the films to the left of diagonal 96 in the same manner as the films to the right of this diagonal were biased by generator 112. In addition to this modification it is also necessary to invert the information which results on write sense lines 148 through 156 during the write cycle. This inversion may easily be accomplished by means of a single stage amplifier circuit inserted in said lines. In order for the same array to function as both an increasing or a decreasing counter switching means must be provided to reverse the bias on the array as discussed above and also to insert the necessary inverter stages in the write sense lines when required.

As mentioned for the previous counter the "end-of-count" signal may easily be attained for the circuit of FIGURE 3 for either the increasing or decreasing counter. This requires adding an additional row of films to the bottom of the array that is biased in the same manner as the other films to the right of diagonal line 96. This additional row of films is then linked by a common sense line to an inverter which gives an output when count register 92 contains modulus $2^n-1$ for an increasing counter or zero for the decreasing counter, where $n$ equals the number of binary stages in the counter. If an end-of-count signal other than the modulus $2^n-1$ or zero is desired it may be obtained by appropriately biasing the "end-of-count" row of films as previously described for the toggle input counter.

Other modifications of this invention will become apparent to those having ordinary skill in the art after reading the foregoing specification and hence it is intended that the foregoing be construed as illustrative and not limitative, the scope of the invention being defined in the appended claims.

What is claimed is:

1. Apparatus for counting comprising an input register of $n$ bistable stages, each stage being representative of a digit of a digital word such that the contents of the register as a whole are representative of the digital word, a plurality of variable state magnetizable devices arranged in an array of columns and rows, means coupling in common to the register stage of least significance as a column of number of devices equal to the number of digits of said digital word for rendering the same indicative of the state of said stage, means coupling in common as columns to each of the other register stages of progressively greater significance one less number of devices for rendering the same indicative of the state of the stage coupled thereto, a plurality of sensing means coupled to the devices of the array such that the first sensing means is coupled to a device in one column, the second sensing means is coupled to a device in each of two columns and so forth so that each successive sensing means is coupled to a device in each of a number of columns one greater, means coupled to all the devices in the array for initiating a count, each sensing means having an output means, means coupling said plurality of sensing output means to said input register stages for altering the stages for altering the count, the first sensing output means being coupled to a register stage of one higher order of significance than the stage of greatest significance to which said first sensing means is otherwise coupled, each succeeding output means except the last being coupled to a stage of one higher order of significance than the highest order stage to which its associated sensing means is otherwise coupled.

2. Apparatus as in claim 1 wherein said variable state devices are of the thin ferromagnetic film type.

3. Apparatus as in claim 2 wherein said thin film devices are anisotropic.

4. Apparatus for analyzing a digital word comprising a 1st to $n$th bistable stage input register, each stage being representative of one digit of a digital word such that the register as a whole is representative of the digital word, a plurality of variable state magnetizable devices, means coupling said devices to said input register for controlling the states thereof so that the devices individually are representative of one digit of said digital word and as a group or groups are representative of the digital word, at least $n-1$ sensing means coupled to said devices, the first sensing means being coupled to a device representative of the lowest order digit thereof, a second sensing means being coupled in common to devices representative of the lowest and next higher order digits thereof and so forth up to the $n-1$ sensing means being coupled in common to devices representative of all the digits of the digital word with the exception of the highest order digit thereof, the arrangement being such the location of a predetermined digit of said digital word may be determined by the output of said sense lines.

5. Apparatus as in claim 4 wherein said magnetizable devices are of the thin ferromagnetic film type.

6. Apparatus for counting comprising an input register of 1st to $n$th stages, a plurality of variable state storage devices, means coupling at least one device to each register stage, means coupled to all of said devices to render the same indicative of the state of the register stage to which each is otherwise coupled, discrete means coupled to each stage for altering same to accomplish counting, a first plurality of $n$ sensing means the first coupled to a device otherwise coupled to the 1st register stage, the next coupled in common to devices otherwise coupled to the 1st and 2nd stages, and so forth up to the $n$th sensing means coupled in common to devices otherwise coupled to all of the register stages 1st to $n$th inclusive, each sensing means having an output means, means coupling said plurality of sensing output means to a portion of the devices, the first sensing output means being coupled to devices otherwise coupled to the 1st to the $n$th register stages, the second sensing output means being coupled to devices otherwise coupled to the 2nd to the $n$th register stages, and so forth up to the $n$th sensing output means being coupled to a device otherwise coupled to the $n$th register stage, means coupled to a portion of said devices for initiating a count, means for clearing the input register after a predetermined time elapse from the time of count initiation, a second plurality of $n$ sensing means the first coupled to a device otherwise coupled to the first sensing output means, the next coupled in common to devices otherwise coupled to the first and second output sensing means and so forth up to the $n$th sensing means of said second sensing plurality coupled in common to devices otherwise coupled to all $n$ output sensing means, each sensing means of said second plurality of sensing means being coupled to said discrete altering means, the first thereof being coupled to the discrete means for altering the 1st register stage, the second thereof being coupled to the discrete means for altering the 2nd register stage, and so forth up to the $n$th sensing means of said second plurality of sensing means being coupled to the discrete means for altering the $n$th stage.

7. Apparatus as in claim 6 wherein said devices are of the thin ferromagnetic film type.

8. Apparatus for counting comprising an input register of $n$ bistable stages, each stage being representative of a digit of a digital word such that the contents of the register as a whole are representative of the digital word, a plurality of variable state storage devices, means coupling in common to each register stage $n+1$ devices for rendering the same indicative of each register stage and thereby forming an array of $n$ columns and $n+1$ rows, discrete means coupled to each register stage for altering same to accomplish counting, a first plurality of $n$ sensing means coupled to the devices of the array such that the first sensing means is coupled to a device in one column, the second sensing means is coupled to a device in each of two columns, and so forth so that each successive sensing means is coupled to a device in each of a number of columns one greater up to the $n$th sensing means coupled to a device in each of $n$ columns, each sensing means having an output means, means coupling said plurality of sensing output means to the devices not coupled to the first plurality of sensing means, the first sensing output means being coupled in common to a device in each of $n$ columns, the second sensing output means being coupled in common to a device in each of $n-1$ columns, and so forth so that each successive sensing output means is coupled to a device in each of a number of columns one less up to the $n$th sensing output means being coupled to a device from one column, means coupled to the devices otherwise coupled to said first plurality of sensing means for initiating a count, delay means coupled to said count initiating means and to said input register for clearing same a predetermined time subsequent to the initiation of a count, a second plurality of $n$ sensing means the first coupled to a device otherwise coupled to the first output sensing means, the second coupled in common to devices otherwise coupled in common to the first and second output sensing means and so forth up to the $n$th sensing means of said second plurality of sensing means coupled in common to devices otherwise coupled to all $n$ output sensing means, each sensing means of said second plurality of sensing means being coupled to said discrete altering means, the first thereof being coupled to the discrete means for altering the 1st register stage, the second thereof being coupled to the discrete means for altering the 2nd register stage, and so forth up to the $n$th sensing means of said second plurality of sensing means being coupled to the discrete means for altering the $n$th stage.

9. Apparatus as in claim 8 wherein said devices are of the thin ferromagnetic film types.

10. Apparatus as in claim 6 and further including means connected between said discrete altering means and said second plurality of sensing means for inverting the outputs therefrom.

11. Apparatus for counting comprising an input register of $n$ bistable stages, each stage being representative of a different digit order of a digital word, a plurality of anisotropic magnetizable elements, each having a magnetization vector angularly rotatable from a preferred alignment at least in one angular direction in response to an applied external field, said element being arranged in an array of columns, means coupling in common to the register stage of least significant order a column of $n$ of said elements for causing each element in said column to exhibit a condition indicative of the state of said stage, means coupling in common as columns to each of the remaining stages of said register of progressively greater significance one less number of elements for causing the elements in each column to exhibit a magnetization state indicative of the state of the stage to which it is coupled, said indicating state being an angular displacement of said magnetization vector away from said preferred alignment when the register stage stores a first value, and alignment of said magnetization vector with said preferred alignment when said register stage stores a second value, a plurality of sensing means coupled to the elements of the array such that a first sensing means is inductively coupled to an element in one column, the second sensing means is coupled to an element in each of two columns and so forth so that each successive sensing means is coupled to an element in each of a number of columns one greater, count initiating means coupled to all of the elements in said array for initiating a change in angular displacement of the magnetization vectors of those elements having their magnetization vectors angularly displaced from said preferred alignment while leaving the magnetization vectors of those elements having their magnetization vectors aligned with said preferred alignment substantially unaltered, each sensing means having an output means, means coupling said plurality of sensing output means to said input register stages for selectively altering the stages for altering the count, the first sensing output means being coupled to a register stage of one higher order of significance than the stage of significance to which said first sensing means is otherwise coupled, each succeeding output means except the last being coupled to a stage of one higher order of significance than the highest order to which its associated sensing means is otherwise coupled, whereby carry requirements are anticipated in parallel by the sensed change in angular displacement of the magnetization vectors of those elements indicative of the storage of said first value in the respective associated register stages.

12. Apparatus for selectively incrementally or decrementally counting comprising an input register of $n$ bistable stages, each stage being representative of a different digit order of a digital word, a plurality of anisotropic magnetizable thin film elements, each having a magnetization vector angularly rotatable from a preferred alignment to an incremental-count position in response to an applied first valued external field and to a decremental-count position in response to an applied second valued external field, said elements being arranged in an array of columns, means coupling in common to the register stage of least significance a column of $n$ of said elements for causing each element in said column to exhibit a condition indicative of the state of said stage, means coupling in common as columns to each of the remaining stages of said register of progressively greater significance one less number of elements for causing said elements in each column to exhibit a magnetization state indicative of the state of the stage to which it is coupled, said indicating state being an angular displacement of said magnetization vector away from said preferred alignment when the register stage stores a first value, and alignment of the magnetization vector with said preferred alignment when said register stage stores a second value, a plurality of sensing means coupled to the elements of the array such that a first sensing means is inductively coupled to an element in one column, the second sensing means is coupled to an element in each of two columns and so forth so that each successive sensing means is coupled to an element in each of a number of columns one greater, count initiating means coupled to all of the elements in said array for initiating a change in angular displacement of the magnetization vectors of those elements having their magnetization vectors angularly displaced from said preferred alignment while leaving the magnetization vectors of these elements having their magnetization vectors aligned with said preferred alignment substantially unaltered, each sensing means having an output means, means coupling said plurality of sensing output means to said input register stage for selectively altering the stages for altering the count, the first sensing output means being coupled to a register stage of one higher order of significance than the stage of significance to which said first sensing means is otherwise coupled, each succeeding output means except the last being coupled to a stage of one higher order of significance than the highest order to which its associated sensing means is otherwise coupled, whereby carry requirements are anticipated in parallel by the sensed change in angular displacement of the magentization vectors of those elements indicative of the storage of said first value in the associated register stage, and operates to either increment or decrement said register in response to the selection of said external field.

13. Apparatus for selectively incrementally or decrementally counting comprising an input register of $n$ bistable stages, each stage being representative of a different digit of a digital word, a plurality of anisotropic magnetic thin film elements, each having a magnetization vector rotatable to an incremental-count position from a preferred alignment in response to an applied first valued external field, and to a decremental-count position in response to an applied second valued external field, said elements being arranged in an array of columns, first and second valued external fields, external field value selection means for selectively causing the counter to increment when said first valued external field is selected and causing the counter to decrement when said second valued external field is selected, means coupling in common to the register stage of least significant order a column of $n$ of said elements for causing each element in said column to exhibit a condition indicative of the state of said stage, means coupling in common as columns to each of the remaining stages of said register of progressively greater significance one less number of elements for causing the elements in each column to exhibit a magnetization state indicative of the state of the stage to which it is coupled, said indicating state being an angular displacement of said magnetization vector away from said preferred alignment when the register stage stores a first value, and alignment of said magnetization vector with said preferred alignment when said register stage stores a second value, a plurality of sensing means coupled to the elements of the array such that a first sensing means is inductively coupled to an element in one column, the second sensing means is coupled to an element in each of two columns and so forth so that each successive sensing means is coupled to an element in each of a number of columns one greater, count initiating means coupled to all of the elements in said array for initiating a change in angular displacement of the magnetization vectors of those elements having their magnetization vectors angularly displaced from said preferred alignment while leaving the magnetization vectors of those elements having their magnetization vectors aligned with said preferred alignment substantially unaltered, said change of displacement of the magnetization vectors with respect to the preferred alignment being indicative of the storage of said first value in the associated register stage, each sensing means having an output means, means coupling said plurality of sensing output means to said input register stage for selectively altering the stages for altering the count, the first sensing output means being coupled to a register stage of one higher order of significance than the stage of significance to which said first sensing means is otherwise coupled, each succeeding output means except the last being coupled to a stage of one higher order of significance than the highest order to which its associated sensing means is otherwise coupled.

14. Apparatus for incrementally or decrementally counting comprising an input register of $n$ bistable stages, each stage being representative of a different digit order of a digital word, a plurality of anisotropic thin film magnetic elements, each having a magnetization vector, angularly displaceable from a preferred alignment in response to applied external fields, said elements being arranged in distinct groups for association with stages of said register, the stage of least significant order associated with a group of $n$ elements, the next higher ordered stage associated with a group of $n-1$ elements, and the succeedingly higher ordered stages associated in order with groups of elements, each group having one less of said elements than the preceding group until the highest significant order stage is associated with a single element, first and second valued external fields, means for selectively coupling said first valued external field to all of said elements for causing the magnetization vectors to assume an incremental-count position with respect to the preferred magnetization vector alignment and for coupling said second valued external field to all of said elements for causing the magnetization vectors to assume a decremental-count position with respect to the preferred magnetization vector alignment to precondition said elements for counting, means coupling each register stage in common to its associated group of said elements for causing the elements in the respective groups to exhibit a magnetization state indicative of the state of their associated stage, said indicating state being an angular displacement of said magnetization vector away from said preferred alignment position when the register stage stores a first value, and alignment of said magnetization vector with said preferred alignment position when said register stage stores a second value, a plurality of sensing means coupled to elements of said groups such that a first sensing means is inductively coupled to a single element in said group of $n$ elements, a second sensing means is inductively coupled to an element in each of said $n$ and said $n-1$ groups, and each succeeding sensing means is respectively coupled to a number of elements which increases by one until the $n$th sensing means is inductively coupled to an element in each of the $n$ groups, count initiating means coupled to all the elements in said array for initiating a change in angular displacement of the magnetization vectors of those elements having their magnetization vectors angularly displaced from said preferred alignment while leaving the magnetization vectors of those elements having the magnetization vectors aligned with said preferred alignment substantially unaltered, each sensing means having an output means, means coupling the plurality of sensing output means to said input register stages for selectively altering stages for altering the count, the first sensing output means being coupled to a register stage of one higher order of significance than the stage of significance to which said first sensing means is otherwise coupled, each succeeding output means except the last being coupled to a stage of one higher order of significance and the highest order to which its associated sensing means is otherwise coupled.

References Cited in the file of this patent

UNITED STATES PATENTS

| | | |
|---|---|---|
| 2,735,005 | Steele | Feb. 14, 1956 |
| 2,840,801 | Better et al. | June 24, 1958 |
| 2,844,812 | Auerback | July 22, 1958 |
| 2,853,238 | Johnson | Sept. 23, 1958 |
| 2,962,212 | Schneider | Nov. 29, 1960 |
| 3,014,656 | O'Brien | Dec. 26, 1961 |
| 3,023,402 | Bittman | Feb. 12, 1962 |

OTHER REFERENCES

"A Forman Procedure for the Logical Design of an Optimum Binary Counter," by Cohen, from Proc. of the Nat'l Electronics Conf., 1954, pages 523–532.

Pohrn and Reubens: "A Compact Coincident-Current Memory," Pro. of the Joint Computer Conf., Dec. 10–12, 1956, pages 120–123.

"Thin Films, Memory Elements . . .," Electrical Manufacturing, vol. 61, No. 1, January 1958, pages 95–98.